United States Patent
Hwang

(10) Patent No.: US 11,524,559 B2
(45) Date of Patent: Dec. 13, 2022

(54) LIGHT TRANSMITTANCE CONTROL PANEL FOR SMART WINDOWS AND SMART WINDOW FOR VEHICLE WITH THE SAME

(71) Applicants: IMAGELAB CO., LTD., Seongnam-Si (KR); HyunHa Hwang, Seoul (KR)

(72) Inventor: HyunHa Hwang, Seoul (KR)

(73) Assignees: IMAGELAB CO., LTD., Seongnam-si (KR); HyunHa Hwang, Seoul (KR)

( * ) Notice: Subject to any disclaimer, the term of this patent is extended or adjusted under 35 U.S.C. 154(b) by 0 days.

(21) Appl. No.: 17/099,505

(22) Filed: Nov. 16, 2020

(65) Prior Publication Data

US 2022/0153097 A1    May 19, 2022

(51) Int. Cl.
*B60J 3/04*     (2006.01)
*G02F 1/1343*   (2006.01)
*G02F 1/1334*   (2006.01)
*G02F 1/137*    (2006.01)

(52) U.S. Cl.
CPC ............ *B60J 3/04* (2013.01); *G02F 1/137* (2013.01); *G02F 1/1334* (2013.01); *G02F 1/134309* (2013.01); *G02F 1/13706* (2021.01); *G02F 2202/043* (2013.01); *G02F 2202/28* (2013.01)

(58) Field of Classification Search
CPC ............ G02F 1/1334; G02F 1/13706; G02F 2202/043
See application file for complete search history.

(56) References Cited

U.S. PATENT DOCUMENTS

2010/0151228 A1* 6/2010 Chin ............ B32B 27/08
                                          428/323
2016/0299366 A1* 10/2016 Oh ............ G02F 1/1334

FOREIGN PATENT DOCUMENTS

| CN | 106324885 A | * | 1/2017 |
| KR | 10-1396235 B1 | | 5/2014 |
| KR | 10-2010760 B1 | | 8/2019 |
| KR | 10-2097815 B1 | | 4/2020 |

* cited by examiner

*Primary Examiner* — Jessica M Merlin
(74) *Attorney, Agent, or Firm* — Stein IP, LLC

(57) ABSTRACT

The present invention relates to a light transmission control panel for a smart window capable of actively adjusting light transmittance as necessary, and a smart window for a vehicle having the same. The present invention discloses The light transmission control panel for a smart window comprising: a first substrate on which a first electrode formed on one surface; a second substrate on which a second electrode is formed on one surface; and a liquid crystal capsule layer provided between the first substrate and the second substrate. According to the present invention of the light transmittance control panel, it has the effect of implementing improved viewing angle characteristics and medium level gray driving characteristics compared to conventional light transmittance control panel.

20 Claims, 9 Drawing Sheets

100 (10, 20)

100 (10, 20)

LIGHT TRANSMITTANCE CONTROL PANEL FOR SMART WINDOWS AND SMART WINDOW FOR VEHICLE WITH THE SAME

BACKGROUND OF THE INVENTION

Field of the Invention

The present invention relates to a light transmission control device, and more particularly, to a light transmission control panel for a smart window capable of implementing a light blocking mode and a transmission mode.

Description of the Related Art

A smart window refers to a window in which the transmittance of sunlight can be freely adjusted, and is also called an electronic curtain, variable transmittance glass, and dimming glass.

Conventionally, in order to control the transmittance of sunlight flowing into the room through the glass, a method of making a colored glass by adding a colored oxide to a glass composition, or attaching a film paper having a specific transmittance to the glass surface has been used.

However, these conventional methods do not have an active control function for sunlight, and are passive methods of selectively shielding or transmitting only in a certain light wavelength range.

However, these conventional methods do not have an active control function for sunlight, and are passive methods of selectively shielding or transmitting only in a certain light wavelength range.

Smart windows are intended to solve such conventional problems, and are active products capable of artificially adjusting light transmittance and the like, and are currently recognized as one of the next-generation products in the glass field.

In order to implement such a smart window, a light transmission control device using liquid crystal has been proposed.

Korean Patent Laid-Open Publication No. 10-1998-038075 discloses a light-shielding film that blocks external light using a liquid crystal display device, and a device that blocks sunlight transmitted indoors with a power switch. However, Korean Patent Laid-Open Publication No. 10-1998-038075 has a light transmittance of 10% or less due to the use of two polarizing plates, and thus, it is difficult to secure a driver's field of view, so that it is difficult to apply to a smart window for a vehicle.

Korean Patent Nos. 10-2097815 and 10-2010760 disclose a device for varying light transmittance using a polarizing plate and a liquid crystal, and Korean Patent No. 10-1396235 discloses a device having the function of automatically or manually adjusting the transmittance using two polarizing plates.

However, such a conventional light transmittance control device basically uses a polarizing plate, requires alignment of liquid crystals, and requires spacer insertion and liquid crystal layer sealing to control the upper and lower plates. There is a problem in that it leads to a decrease in haze characteristics, and also increases the manufacturing cost as the number of processes increases.

On the other hand, in order to solve this problem, a transmittance control film for a vehicle using PDLC (Polymer Dispersed Liquid Crystal) in a capsule form has been proposed. However, in the case of the conventional PDLC-type transmittance control film, the light passing through the PDLC is converted into scattered light, making the driver's visibility unnatural, which can hinder the driver's safe driving, so it is actually applied to a smart window for a vehicle. There was a difficult limit.

SUMMARY OF THE INVENTION

The present invention is to solve the above problems, and an object of the present invention is to provide a light transmission control panel for a smart window capable of actively adjusting light transmittance as needed, and a smart window for a vehicle having the same.

In particular, the present invention can omit the polarizing plate, liquid crystal alignment (alignment film), spacer insertion, and sealing processes required for the conventional liquid crystal-based light transmittance control device, thereby dramatically simplifying the manufacturing process and greatly enhancing the light-shielding performance. Even so, it provides a light transmission control panel for a smart window capable of realizing a performance that meets the required optical characteristics of a smart window for a vehicle, and a smart window for a vehicle having the same.

A light transmission control panel for a smart window according to the present invention for achieving the above object includes: a first substrate having a first electrode formed on one surface thereof; A second substrate on which a second electrode is formed on one surface; and a liquid crystal capsule layer provided between the first substrate and the second substrate.

The liquid crystal capsule layer may include a plurality of nano liquid crystal capsules; and a polymer matrix in which the plurality of nano liquid crystal capsules are disposed.

The nano liquid crystal capsule includes a core material including a plurality of liquid crystals and a dichroic dye having positive dielectric anisotropy; and a shell material forming an outer wall of the core material.

The average particle size of the plurality of nano liquid crystal capsules is made of 50 nm~200 nm.

The dichroic dye is composed of 2.0 to 12.0% by weight based on the total weight of the core material.

The liquid crystal has a refractive index anisotropy ($\Delta n$) of 0.01 to 0.18.

The plurality of liquid crystals is arranged in various directions in a state where no voltage is applied, and may preferably be arranged radially.

According to the light transmission control panel according to the present invention, it is possible to implement a very high shading rate and also satisfy the light characteristics essential for a smart window for a vehicle.

According to the light transmittance control panel following this invention, it has the effect of implementing improved viewing angle characteristics and medium level gray driving characteristics compared to conventional light transmittance control panel.

According to the light transmission control panel according to the present invention, the polarizing plate, liquid crystal alignment (alignment film), spacer insertion and sealing processes, etc., which were required for the conventional liquid crystal-based light transmittance control device, can be omitted, thereby dramatically simplifying the manufacturing process, and it is possible to significantly reduce manufacturing costs.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

The present invention particularly relates to a light transmission control panel for a smart window that is attached to a window of a vehicle and is capable of selectively driving a light-blocking mode for blocking light incident to the window and a transmission mode for transmitting the incident light.

In particular, the present invention relates to a light transmission control panel for a smart window capable of significantly increasing a light blocking rate in a light blocking mode and sufficiently securing light transmittance and visibility in a front/side/rear/upper direction of a vehicle in a transmission mode.

Figure 1:
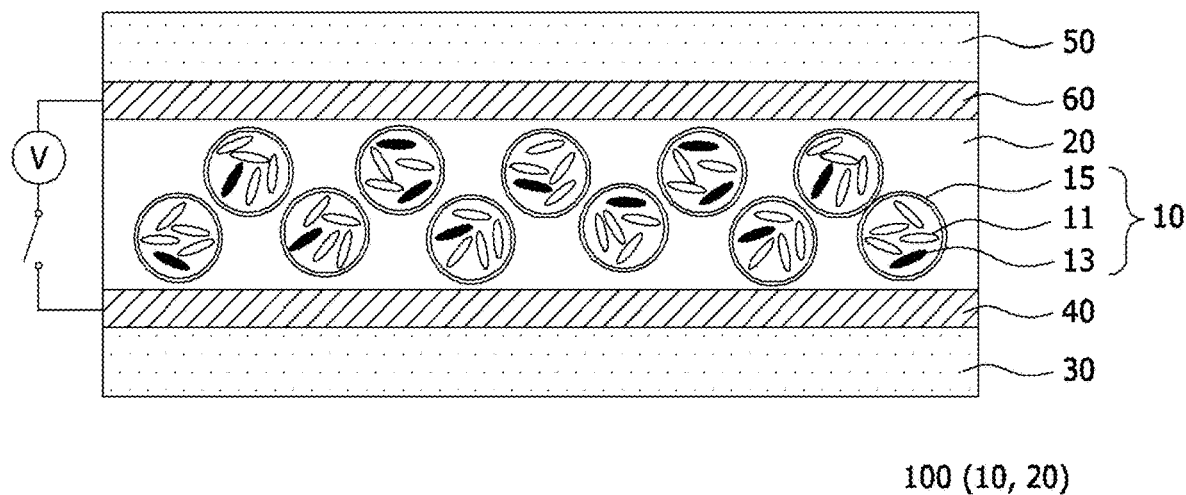
FIG. 1 is a cross-sectional view of a light transmission control panel for a smart window according to the present invention.

FIG. 1 is a cross-sectional view of a light transmission control panel for a smart window according to the present invention. Referring to FIG. 1, a light transmission control panel for a smart window according to the present invention includes a first substrate 30, a first electrode 40, a second substrate 50, a second electrode 60, and a liquid crystal capsule layer 100.

The first substrate 30 is a thin plate made of a transparent material, and may be formed of a plastic substrate as well as a glass substrate.

When the first substrate 30 is formed of a resin substrate, preferably, the first substrate 30 may be formed at least one selected from triacetylcellulose (TAC), polyimide (PI), polyethersulfone (PES), polyethylene terephthalate (PET), polyethylene naphthalate, (PEN), and polyarylate (PAR).

The first electrode 40 is a conductive material formed on one surface of the first substrate and forms a vertical electric field together with the second electrode, and may preferably be formed of a transparent conductive material.

According to an embodiment, the first electrode 40 may be formed of at least one selected from indium tin oxide (ITO), indium zinc oxide (IZO), zinc oxide, tin oxide, and fluorine doped Tin oxide (FTO), silver nano wire (Ag NW), graphene and PEDOT:PSS.

In addition, the first electrode 40 may be formed in the form of a thin film on the upper surface of the first substrate 30 in a vacuum state through a deposition or sputtering process as well as several ways of coating or printing processes.

Like the first substrate 30, the second substrate 50 is made of a thin plate made of a transparent material, and may be formed of a glass substrate made of a glass material as well as a film-type resin substrate having flexibility.

The second electrode 60 is a conductive material formed on one surface of the second substrate 50 and forms a vertical electric field together with the first electrode.

Like the first electrode 40, the second electrode 60 may be formed of a transparent conductive material.

The liquid crystal capsule layer 100 is formed between the first substrate 30 and the second substrate 50 and transmits or blocks most of the incident light to adjust the transmittance of the incident light.

The liquid crystal capsule layer 100 may have a thickness of 5.0 to 15.0 μm, and preferably 8.0 to 12.0 μm.

When the thickness of the liquid crystal capsule layer 100 is less than 5 μm, durability is greatly reduced, and when it exceeds 15.0 μm, haze and light transmission characteristics are greatly decreased, making it unsuitable for smart windows.

The liquid crystal capsule layer 100 includes a plurality of nano liquid crystal capsules 10, and a polymer matrix 20 in which the plurality of nano liquid crystal capsules 10 are disposed.

The nano liquid crystal capsule 10 is made of a core material 11, 13 and a shell material 15. The core material 11, 13 contains a number of liquid crystal molecules 11 and dichroic dyes 13. The shell material 15 forms the outer wall of the core material.

The liquid crystal 11 of the nano liquid crystal capsule 10 has optical isotropy when voltage is not applied, and exhibits optical anisotropy proportional to the square of the electric field (E) when voltage is applied.

The liquid crystal of the core material may be formed of at least one selected from Nematic, Smectic, Cholesteric, and Chiral Smectic, and preferably composed of nematic liquid crystal.

The dichroic dye 13 of the core material is easily arranged by interlocking with the dichroic property, which has a large difference in absorbance in the major axis direction and the minor axis direction of the molecule, has a high affinity for the liquid crystal as a host material, and the alignment of the liquid crystal according to the application of voltage. Use one that has a possible orientation and durability that can withstand the manufacturing process and conditions of use.

The dichroic dye 13 may be made of a dye having a color, and black, red, green, blue, yellow, magenta, and cyan may have any one color or a color composed of a mixture thereof.

The light transmission control panel of the present invention may be installed on a vehicle window. In this case, the light transmission control panel should be able to maximize the effect of adjusting the light transmittance, and should be able to prevent light in a specific wavelength band from being reflected by a dichroic dye 13 in the transmission mode and obstructing the driver's view. In consideration of this point, it is preferable to form the dichroic dye 13 with a black dye.

The shell material 15 initially surrounds the outer surface of the core material formed in the form of a spherical droplet, so that the core material remains trapped inside the shell material 15.

The shell material 15 may be formed of a water-soluble polymer or an oil-soluble polymer.

According to a preferred embodiment, when the shell material 15 is formed of a water-soluble polymer. It can be formed with at least one selected from polyvinyl alcohol (PVA), starch, carboxyl methyl cellulose (CMC), methyl cellulose, ethyl cellulose, polyvinyl pyrrolidone, gelatin, alginate, casein and gum Arabia.

According to a preferred embodiment, when the shell material 15 is formed of an oil soluble polymer, it may be formed with at least one selected from amino resins such as polymethylmethacryate (PMMA), polyurea, polyurethane, urea formaldehyde (UF) and melamine formaldehyde (MF).

According to a preferred embodiment, the shell material (ie, the outer wall) 15 may be formed in a double shell structure. In this case, different kinds of shell materials are configured to form an inner shell and an outer shell.

Specifically, the inner shell is formed first and then the outer shell is sequentially formed. Compared to a single shell structure, the double shell structure has the ease of controlling anchoring energy of liquid crystal molecules and excellent solvent resistance characteristics.

The inner shell material may be formed of at least one selected from a water-soluble polymer having soft properties, for example, gelatin, arabic gum, and polyvinyl alcohol.

The outer shell material may be formed of at least one selected from amino resin, polyamide-epichlorohydrin resin, and formaldehyde resin, which are oil soluble polymers.

On the other hand, these nano capsules 54 can be manufactured using a complex coacervation method, a membrane emulsification method, an in-situ polymerization method, an interfacial polymerization method, and the like.

The polymer matrix 20 of the present invention is constrained so that a plurality of nano liquid crystal capsules 10 are dispersed and disposed therein. The polymer matrix 20 provides a binder function in which the nano liquid crystal capsules 10 are dispersed and disposed on the first substrate 30.

The polymer matrix 20 of the present invention is constrained so that a plurality of nano capsules 10 can be fixed in a dispersed and arranged state. The polymer matrix 20 provides a binder function in which the nanocapsules 54 are distributed and fixed on the first substrate 30.

The polymer matrix 20 may be largely formed of a water soluble polymer binder or a water dispersible binder.

Water-soluble polymer binders may be at least any one selected from polyvinyl alcohol (PVA), starch, methoxy cellulose, hydroxy ethylcellulose, carboxyl methyl cellulose (CMC), methyl cellulose, ethyl cellulose, polyacrylate soda, acryl amide/acrylate copolymer, acrylamide/Acryl amide/acrylate/methacrylic acid terpolymer, polyacrylamide, alginate soda, polyvinyl pyrrolidone, gelatin, alginate, casein and gum Arabia.

Water-dispersible binders may be at least any one selected from alkyd resin, polyamide epichlorohydrin resin, polyurethane resin, urea formaldehyde resin, melamine formaldehyde resin, melamine-urea-formaldehyde resin, acrylate copolymer latex, styrene/butadiene copolymer latex, styrene/butadiene/acrylic copolymer Latex, Vinyl acetate resin emulsion, Vinyl acetate/acrylate copolymer emulsion, Styrene/acrylate copolymer emulsion and acrylate resin emulsion.

The liquid crystal capsule layer 100 as described above may be formed by mixing a plurality of nano liquid crystal capsules 10 with a polymeric binder to be a coating solution, followed by coating and curing the coating solution on the first substrate 30 on which the first electrode 40 is formed.

Figure 8:
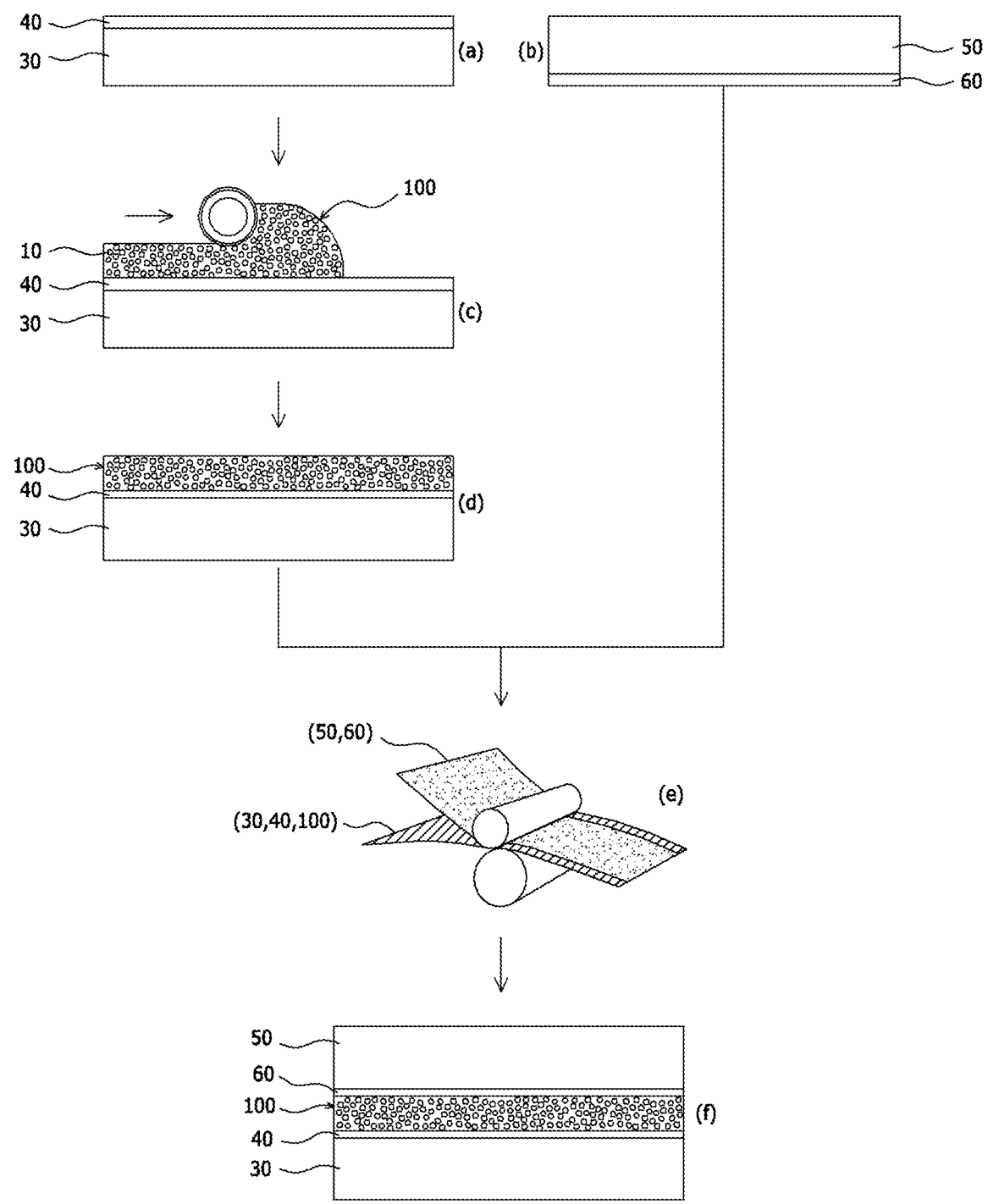
FIG. 8 is a process flow chart showing a method of manufacturing a light transmission control panel for a smart window according to the present invention.

FIG. 8 is a flowchart illustrating a method of manufacturing a light transmission control panel for a smart window according to the present invention.

First, a first substrate 30 on which a first electrode 40 is formed on one surface and a second substrate 50 on which a second electrode 60 is formed on one surface are prepared (refer to FIGS. 8(a) and 8(b)).

A coating solution in which a plurality of nano liquid crystal capsules 10 and a polymeric binder are mixed is coated on the first substrate 30 (see FIGS. 8(c) and 8(d)).

In this case, as a method of coating the coating solution on the first substrate 30, bar coating, slot-die coating, knife coating, or the like may be applied.

When the coating solution is coated on the first substrate 30, the first substrate 30 and the second substrate 50 are bonded to each other through a hot lamination process (see FIG. 8(e)).

At this time, the roll temperature of the hot lamination process is preferably set to 90~180° C. This is because when the roll temperature is higher than 180° C., wrinkles are generated on the first and second substrates made of a plastic material, and when the roll temperature is lower than 90° C., adhesion may be lowered in the bonding process of the first and second substrates.

When the above-described process is completed, light transmission control panel having the liquid crystal capsule layer 100 is completed. The liquid crystal capsule layer 100 is formed between the first substrate 30 on which the first electrode 40 is formed and the second substrate 50 on which the second electrode 60 is formed as shown in FIG. 8(f).

Hereinafter, characteristics of the core material of the nano liquid crystal capsule 10 constituting the liquid crystal capsule layer 100 of the present invention will be described in more detail.

For reference, when considering that the installation to a vehicle, it should be designed to have light characteristics that can ensure safe driving of the driver. If the light characteristics of the smart window are poor, it may interfere with the driver's driving capability, which may lead to a car accident.

Here, the optical characteristic that can guarantee the driver's safe driving means a characteristic that can secure sufficient visibility in the front and side directions of the driver (hereinafter referred to as 'required optical characteristic'). For example, the required optical characteristics may be minimum light transmittance, haze characteristics, and viewing angle characteristics that must be ensured in the transmission mode.

In addition, the smart window for a vehicle must be capable of sufficiently implementing the light-shielding characteristics as well as the required light characteristics for its use. For example, in the case of a rear seat window and sunroof that is not directly related to securing the driver's visibility, such a shading characteristic may be further required.

As a result, in order to manufacture a practically sellable smart window, as described above, it is necessary to have the required optical characteristics to ensure safe driving of the driver.

On the basis of auto industry, the required optical characteristics of a smart window for a vehicle should be able to implement a light transmittance of about 30% or more in a transmission mode, and at the same time have a haze characteristic of less than 7.0%, and an excellent viewing angle characteristics.

Here, the haze is a characteristic related to opacity, and the lower the value, the better the optical characteristic. In addition, the excellent viewing angle characteristics refers to a property in which the light transmittance in the front direction and the side direction thereof are almost the same when looking at the smart window.

In addition, the smart window for a vehicle is able to sufficiently secure the transmittance and visibility of the vehicle driver in the front/side/upper/rear directions in the transmission mode, and at the same time implement a high shading rate in the shading mode. Here, the high light blocking rate means a light transmittance of about 10% or less.

The light transmission control panel of the present invention can implement a much higher light blocking rate than a conventional liquid crystal-based light transmission control device in the light blocking mode, and can also implement a light transmittance that meets the required light characteristics in the transmission mode.

Furthermore, the light transmission control panel of the present invention may implement more improved haze characteristics, viewing angle characteristics, and medium level gray characteristics compared to the conventional light transmission control device.

In addition, the optical performance of the light transmission control panel according to the present invention includes the size of the nano liquid crystal capsule 10, the concentration of the dichroic dye 13, birefringence ($\Delta n$) of liquid crystal, alignment state of liquid crystal and coating thickness of liquid crystal capsule layer 100. It is implemented by organically combining. Hereinafter, this will be described in detail.

(1) Size of Nano Liquid Crystal Capsule 10

A plurality of nano liquid crystal capsules 10 constituting the liquid crystal capsule layer 100 are formed to have an average particle size of 50 nm to 200 nm. In other words, a plurality of nano liquid crystal capsules 10 have a particle size distribution of various sizes, but the average value (ie, average particle size) of various particle sizes of these nano liquid crystal capsules is configured to be included in 50 nm to 200 nm.

In addition, the nano liquid crystal capsules 10 are dispersed in the polymer matrix 20 at a filling rate of 30 to 70%.

The liquid crystal capsule layer 100 of the present invention exhibits differentiated optical characteristics compared to conventional liquid crystals by forming nano liquid crystal capsules with such a size and filling rate.

Figure 2:
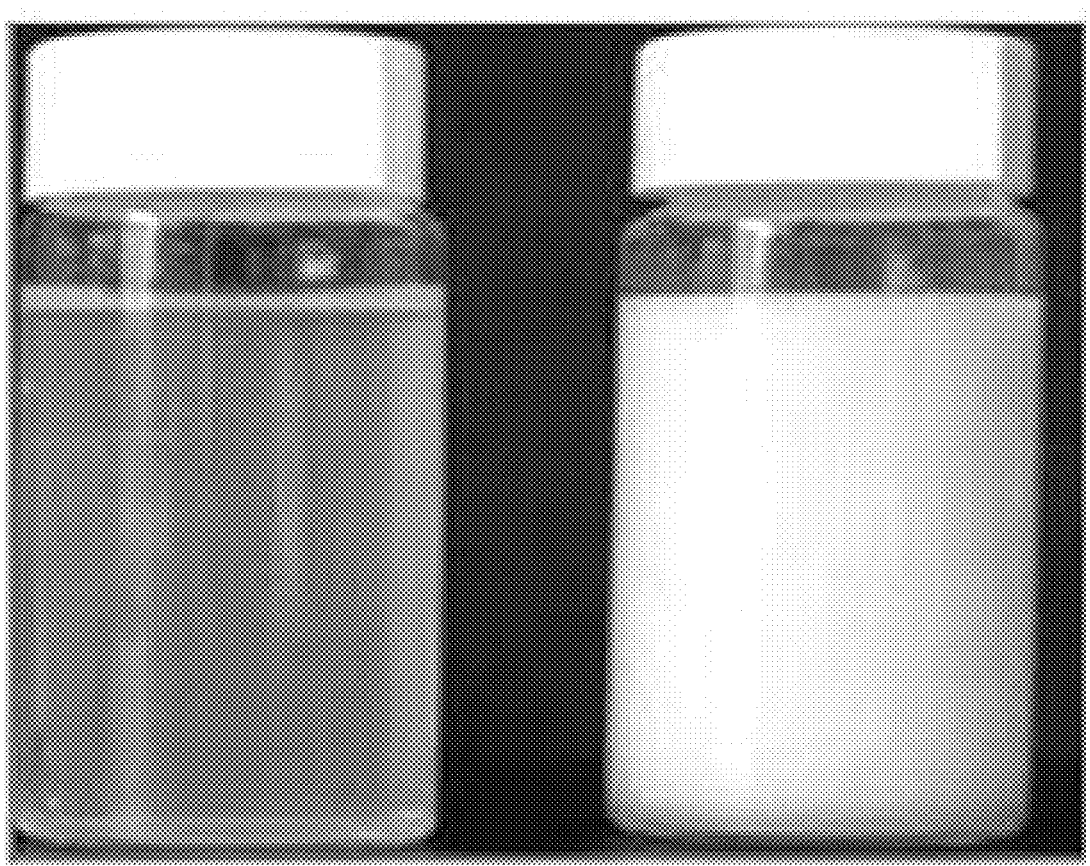
FIG. 2 is a comparative experimental example of a nano emulsion and a micro emulsion.

With reference to FIGS. 2 and 3, differentiated optical characteristics of the liquid crystal capsule layer 100 according to the present invention will be described in detail.

FIG. 2 is a comparative experimental example of a nano emulsion and a micro emulsion, and the sample contained in the left vial bottle of FIG. 2 is a nano emulsion obtained by transforming a nano liquid crystal capsule 10 into an average diameter of 100 nm. The sample contained in the vial bottle is a micro emulsion composed of liquid crystal capsules having an average diameter size of 1.0 μm.

As clearly shown in the comparative experiment example of FIG. 2, it can be seen that the nano emulsion sample on the left looks transparent, while the micro emulsion sample on the right looks white and opaque.

The inventor of the present invention was able to confirm that, through a comparative experiment as shown in FIG. 2, light passes through the medium without being scattered or affected when passing through the medium according to the size of particles contained in a medium.

In particular, when the liquid crystal capsule is formed in a nano size smaller than the wavelength of visible light (specifically, the average diameter size is smaller than ¼ of the maximum wavelength of visible light), it can be seen that some of the visible light incident on the sample is completely transmitted. Preferably, when the nano liquid crystal capsule is formed with an average diameter size of 100 nm or less, scattering hardly occurs, so that most of the incident light is transmitted as it is.

Figure 3A:
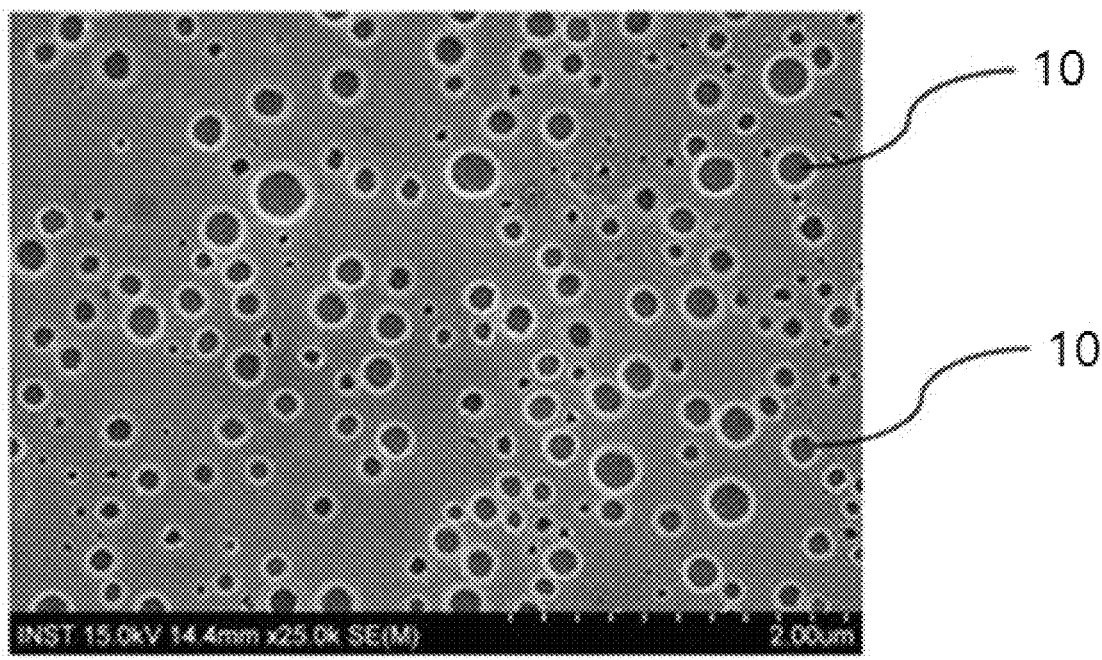
FIG. 3A is a scanning electron microscope (SEM) photograph analyzing the surface of a liquid crystal capsule layer according to the present invention.

FIG. 3A is a scanning electron microscope (SEM) photograph analyzing the surface of a nano liquid crystal layer according to the present invention, and those dispersed in a plurality of holes correspond to the nano liquid crystal capsule of the present invention. And, FIG. 3B is analysis data showing the particle size distribution of the nano liquid crystal capsules of FIG. 3A.

In FIG. 3A, the reason why the sizes of the nano liquid crystal capsules 10 are not constant is that the sizes of the nano liquid crystal capsules have certain size distribution characteristics.

Figure 3B:
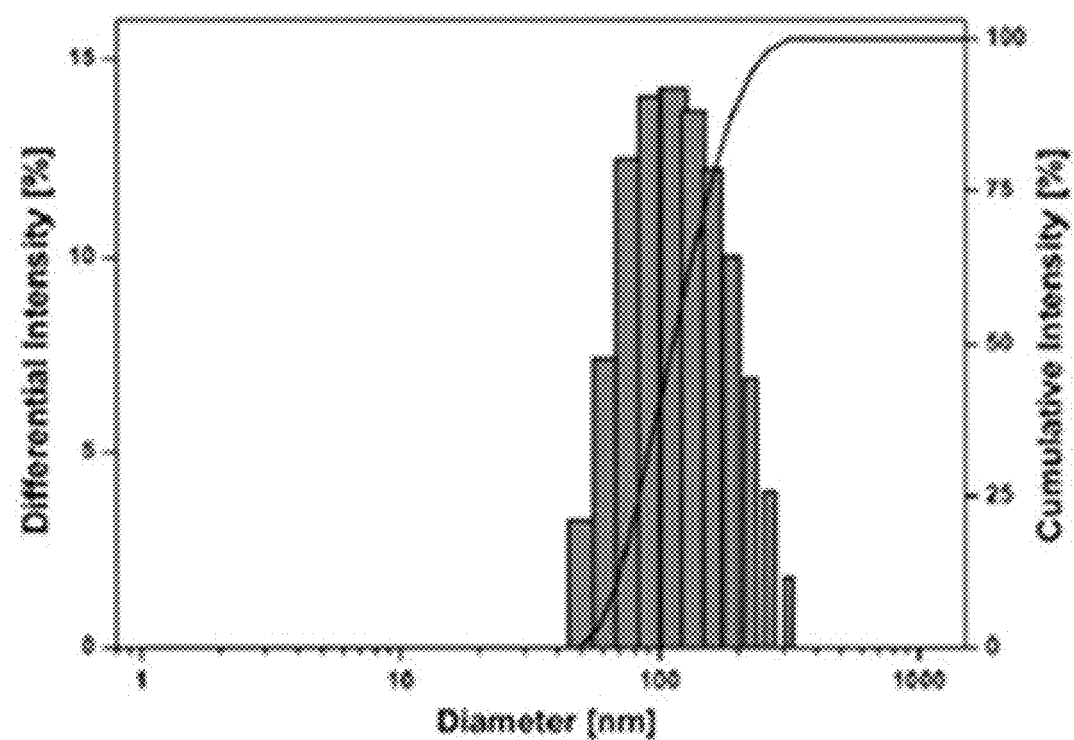
FIG. 3B is an analysis data showing the particle size distribution of the nano liquid crystal capsule of FIG. 3A.

That is, as can be seen from the nano liquid crystal capsule 10 particle size distribution data of FIG. 3B, the average particle size of the nano liquid crystal capsules is about 120 nm, some small-sized nano capsules are about 80 nm, and some large-sized nano capsules have a particle size of about 300 nm.

These nano liquid crystal capsules 10 are not adhered to each other or are not densely clustered, but are arranged in a structure in which most of them are dispersed within a polymer matrix 20 with a certain distance from each other.

The light transmission control panel of the present invention is configured such that the nano liquid crystal capsules 10 are formed with an average diameter size of 200 nm or less, and the nano liquid crystal capsules 10 are not adhered to each other and are distributed and arranged in a state that is separated by a certain distance. Light incident on the liquid crystal capsule layer 100 is not scattered and can be transmitted mostly.

Even if the average particle size of the nano liquid crystal capsules 10 is less than 200 nm and the filling rate of the nano liquid crystal is configured to be 80% or more like the conventional electrophoresis method or the micro liquid crystal capsule method, the scattering degree is increased. Thus, the initial state becomes an opaque state, and the above-described required optical characteristics are deteriorated.

Specifically, the applicant of the present invention confirmed that a transparent initial state can be implemented when the nano liquid crystal capsule 10 has a filling rate within the range of 30 to 70% in the polymer matrix 20 and is dispersedly disposed through a number of experiments.

For reference, the term 'filling rate or density' used in the present invention refers to the fraction of the space occupied by the nano liquid crystal capsule 10 in the polymer matrix 20, and refers to the volume % occupied by the nano liquid crystal capsule 10 relative to the total volume of the liquid crystal capsule layer 100.

And the reason why the maximum average particle size of the nano liquid crystal capsule 10 is limited to 200 nm is that the scattering degree of the liquid crystal capsule layer 100 is irrespective of the change in the filling rate of the nano liquid crystal capsule 10 when the average particle size of the nano liquid crystal capsule 10 becomes larger than 200 nm as a result of the experiment according to the change in the average particle size. This is because the optical properties are remarkably deteriorated due to a large scattering degree of the nano liquid crystal capsules 10.

(2) Concentration of Dichroic Dye

For reference, the conventional liquid crystal-based light control device for smart windows has a cell gap of 5 to 15 μm, and the concentration of the dichroic dye 13 is generally 1.5% by weight or less. This is because the conventional liquid crystal-based light control device for smart windows cannot satisfy the aforementioned required optical characteristics when the concentration of the dichroic dye 13 exceeds 1.5% by weight. Accordingly, there is a limitation that can meet shading performance of the consumer needs.

If, while satisfying the required optical characteristics, the concentration of the dichroic dye 13 was greater than 1.5% by weight, the cell gap had to be formed to be thinner than 5 μm. However, if the cell gap is formed less than 5 μm, there is a problem that the durability of the light control device is greatly decreased.

On the other hand, the light transmission control panel according to the present invention can satisfy the aforementioned required optical characteristics even if the concentration of the dichroic dye 13 is mixed at a much higher level than that of the conventional smart window's in the thickness of the liquid crystal capsule layer 100 (i.e., cell gap) from 5.0 to 15.0 μm.

Specifically, the dichroic dye 13 of the present invention may be made of 2.0 to 12.0% by weight based on the total weight of the core material.

Therefore, the light transmission control panel according to the present invention can maximize the value as a smart window product. This is because in the transmission mode, the transmittance and visibility in the front/side/upper/rear direction of the vehicle driver can be sufficiently secured, and in the light-blocking mode, the shading rate can be greatly increased.

As described above, the performance of the smart window is made possible by controlling the size of nano liquid crystal capsule 10 and the concentration of the dichroic dye 13 described above and the birefringence ($\Delta n$) of the liquid crystal, the alignment state of the liquid crystal, and the coating thickness of the nano liquid crystal layer to be described later.

(3) Birefringence ($\Delta n$) and Alignment Stat of Liquid Crystal

The liquid crystal 11 constituting the nano liquid crystal capsule 10 of the present invention is made of a liquid crystal having a positive dielectric anisotropy ($\Delta \varepsilon$) property.

And, the liquid crystal 11 constituting the nano liquid crystal capsule 10 is characterized in that the birefringence ($\Delta n$) is 0.01 to 0.18.

The inventors of the present invention set the birefringence ($\Delta n$) of the liquid crystal 13 constituting the nano liquid crystal capsule 10 to 0.01 to 0.18 when forming the nano liquid crystal capsule with a particle size of 50 nm to 200 nm and the concentration of the dichroic dye to 2.0 to 12.0 wt %. By forming, it was found that the aforementioned required optical characteristics can be satisfied.

Preferably, the birefringence ($\Delta n$) of the liquid crystal 11 constituting the nano liquid crystal capsule 10 may be 0.01 to 0.16, more preferably 0.01 to 0.14, and even more preferably 0.01 to 0.12.

This is because if the birefringence ($\Delta n$) of the liquid crystal 11 constituting the nano liquid crystal capsule 10 exceeds 0.18, the above-described required optical characteristics cannot be satisfied.

That is, if the birefringence ($\Delta n$) of the liquid crystal 11 exceeds 0.18, the haze value increases to 7.0% or more in proportion to the increase in the value, and the transmittance value in the transmission mode decreases significantly less than 30.0%, thus it becomes difficult to provide excellent visibility.

And, when the birefringence ($\Delta n$) of the liquid crystal 11 constituting the nano liquid crystal capsule 10 is less than 0.01, the shape of the liquid crystal molecules is deformed. In this case, since the dichroic dye 13 is not easily arranged in association with the alignment state of liquid crystals 11 according to the application of voltage, it is difficult to control the smart window function (ie, control of the light blocking mode and the transmission mode).

After all, the best light transmission control panel for a smart window for a vehicle of the present invention is achieved by controlling the size of the nano liquid crystal capsule 10, the concentration of the dichroic dye 13, the birefringence ($\Delta n$) of the liquid crystal 11 and the thickness of the nano liquid crystal layer 100 under the above conditions. The characteristics can be satisfied, and the technical advantage and other advantages compared to the conventional liquid crystal-based smart window are obtained.

For reference, when a light transmission control device is installed in a vehicle, the light transmission control device must be manufactured in the form of a film, and accordingly, a plastic substrate made of a polymer resin material must be used as the substrate of the light transmission control device.

However, the conventional liquid crystal-based light control device for a smart window has a problem in that when such a polymer resin substrate is used, the haze characteristic is greatly increased to the level of 8.5 to 9.5%, so that the light characteristics of the smart window are deteriorated.

The liquid crystals 11 of the liquid crystal capsule layer 100 of the present invention are provided without alignment treatment.

For reference, the conventional liquid crystal-based light transmission control device is formed in a state in which liquid crystal molecules are aligned in a specific direction using an alignment layer. That is, in the conventional liquid crystal-based light transmission control device, an alignment layer is formed on one surface of a substrate and rubbed to align liquid crystal molecules in a specific direction.

On the other hand, the liquid crystal 11 of the liquid crystal capsule layer 100 of the present invention is formed without alignment treatment as compared by the alignment layer of the conventional liquid crystal-based light transmission control device.

Figure 4:
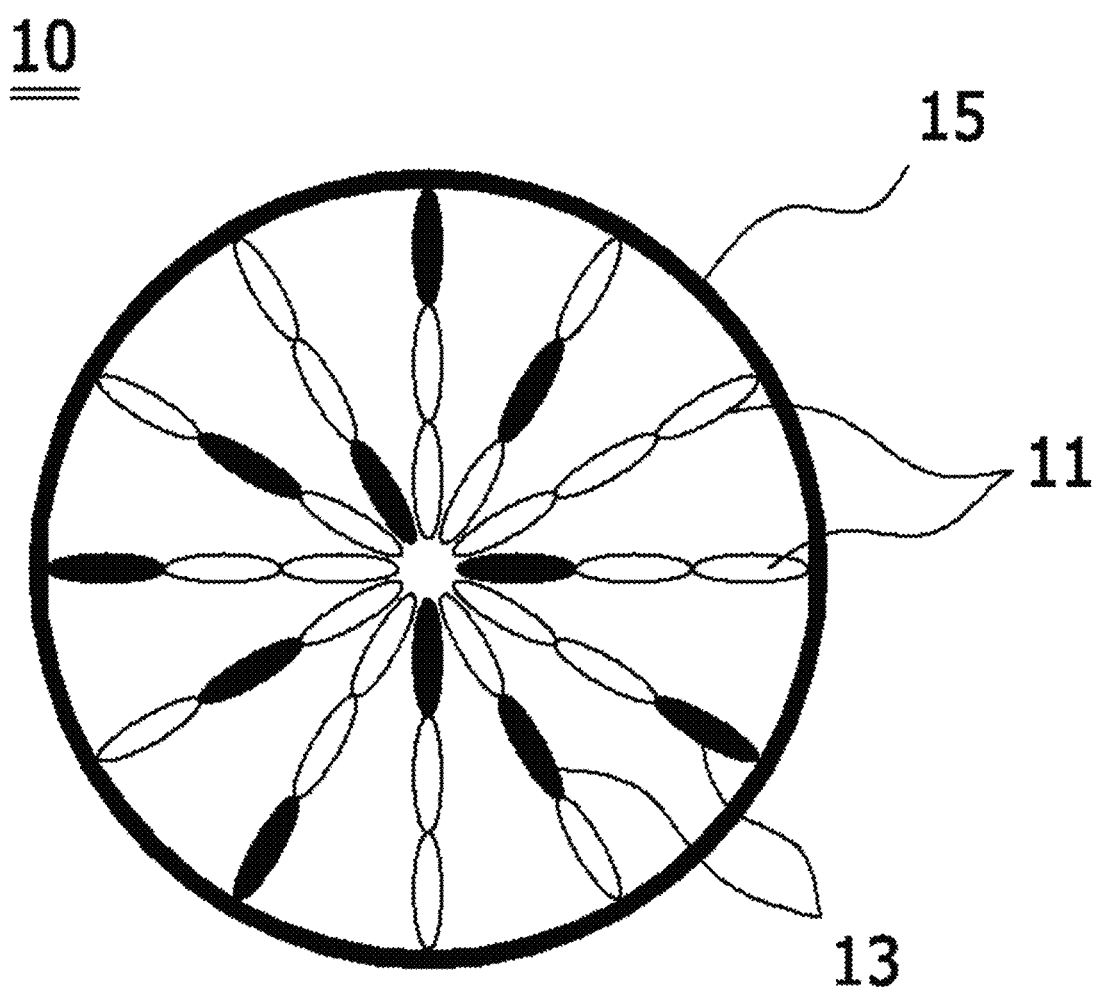
FIG. 4 is a cross-sectional view showing a liquid crystal arrangement form of a nano liquid crystal capsule according to the present invention.
Figure 6:
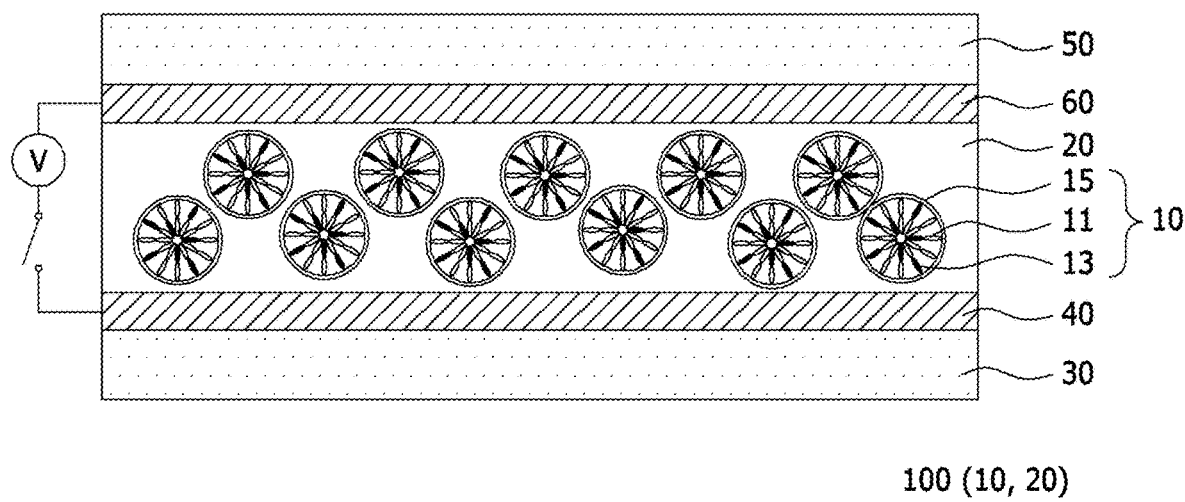
FIG. 6 is a cross-sectional view showing the operation of the light-blocking mode of the light transmission control panel for a smart window according to the present invention.

Specifically, the liquid crystal molecules 11 of the nano liquid crystal capsule 10 may be arranged in a number of different directions as shown in FIGS. 1, 4 and 6 in an initial state (ie, a voltage is not applied).

Preferably, at least some of the liquid crystal molecules 11 of the nano liquid crystal capsule 10 may be arranged in a symmetrical structure in an initial state.

More preferably, at least some of the liquid crystal molecules 11 of the nano liquid crystal capsule 10 may be arranged in a radial shape as shown in FIGS. 4 and 6 in an initial state (ie, a voltage-free state).

In the liquid crystal capsule layer 100 of the present invention, since the liquid crystals 11 are not aligned and are arranged in various directions, it is possible to implement superior viewing angle characteristics compared to a conventional liquid crystal-based light transmission control device. Here, the excellent viewing angle property means that the light transmittance in the front direction and the side direction of the smart window is almost the same. In addition, the excellent viewing angle characteristics of the light transmission control panel of the present invention are due to differentiated optical characteristics according to the size and filling rate of the nano liquid crystal capsule 10 described above.

Figure 5:
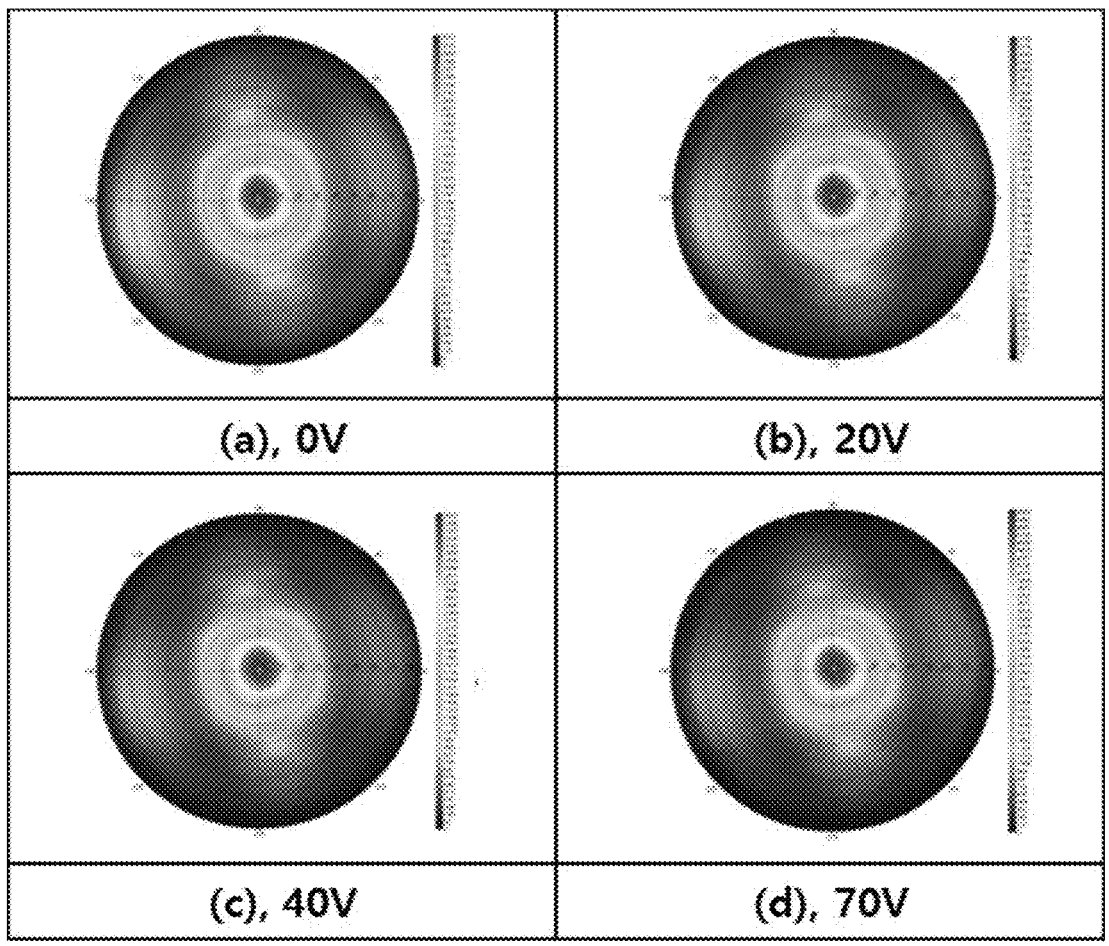
FIG. 5 is a contour chart that measures the two-way optical transmittance function of the light transmittance control panel for smart windows according to this invention.

FIG. 5 represents the results of bi-directional transmission function; BDTF measurement of the light transmission control panel in accordance with this invention, with an applied voltage of 0V for FIG. 5(a), 20V for FIG. 5(b) and 40V for FIG. 5(c) and 70V for FIG. 5(d). As can be inferred from FIG. 5(a) to 5(d), the light transmittance control panel under this invention shows excellent viewing angle characteristics for the light transmittance.

Table 1 below is experimental data showing the haze, light transmittance in the shading mode, and light transmittance in the transmission mode of Embodiments 1 to 7 according to the present invention. For reference, Table 1 shows that the decimal point is rounded off from the result value of each measurement.

TABLE 1

| No. | Haze (0 V) | Toff (0 V) | Ton (Sat.) |
|---|---|---|---|
| Embodiment 1 | 5% | 7% | 42% |
| Embodiment 2 | 5% | 6% | 40% |
| Embodiment 3 | 5% | 5% | 39% |
| Embodiment 4 | 5% | 4% | 37% |
| Embodiment 5 | 5% | 3% | 35% |
| Embodiment 6 | 5% | 2% | 33% |
| Embodiment 7 | 5% | 2% | 32% |

In Embodiments 1 to 7 of Table 1, the type of the dichroic dye 13, the average particle size of the nano liquid crystal capsule 10, the thickness of the liquid crystal capsule layer 100, the birefringence ($\Delta n$) of the liquid crystal 11, and alignment state of the liquid crystal 11 were all formed the same, but only the concentration of the dichroic dye 13 was formed differently.

Specifically, in Embodiments 1 to 7 of Table 1, the dichroic dye 13 was S-428 (black) manufactured by Mitsui Fine Chemical, and the average particle size of the nano liquid crystal capsule 10 was 150 nm, and the thickness of the liquid crystal capsule layer 100 was formed to be 10 μm, the birefringence ($\Delta n$) of the liquid crystal 11 was formed to be 0.17, and the liquid crystal molecules 11 of the nano liquid crystal capsule 10 were in an initial state (i.e., no voltage was applied) of a radial shape.

In Table 1, the dichroic dye concentration of embodiment 1 is 4% by weight, the dichroic dye concentration of embodiment 2 is 5% by weight, the dichroic dye concentration of embodiment 3 is 6% by weight, and the dichroic dye concentration of embodiment 4 is 7% by weight, the dichroic dye concentration in Embodiment 5 is 8% by weight, the dichroic dye concentration in Embodiment 6 is 9% by weight, and the dichroic dye concentration in Embodiment 7 is 10% by weight.

'Ton(Sat.)' in Table 1 is a voltage applied for driving in the transmission mode, and the light transmittance gradually increases as the applied voltage increases, and means a voltage at a level that does not increase, that is, a saturation voltage. Embodiments 1 to 7 of Table 1 show the characteristics of the saturation voltage at 70V. Therefore, 'Ton (Sat.)' in Table 1 indicates the light transmittance at an applied voltage of 70V.

The 'Ton(0V)' in Table 1 shows the light transmittance (ie, light-blocking mode) in the state where no voltage is applied.

As can be seen from Table 1, in the light-blocking mode, the 7% or lower light transmittance achieved, and even if a high light-shielding rate of 2 to 4% is implemented in the light-blocking mode, 30% or higher transmittance is achieved in the transmittance mode as required for the vehicle smart window.

In addition, it can be seen that haze also shows a very low value of 5% level.

After all, according to the light transmission control panel for a smart window according to the present invention, even if the light blocking performance is greatly improved by using a much larger amount of dichroic dye 13 than the conventional liquid crystal-based light transmission control device, the required characteristics of vehicle smart panel like, viewing angle characteristics, medium level gray driving characteristics and the transmission mode characteristics are implemented better than conventional smart windows.

On the other hand, in Embodiments 1 to 7 of Table 1, the birefringence ($\Delta n$) of the liquid crystal 11 was formed to be 0.17. If the liquid crystal is formed to a value lower than 0.17, the Haze characteristics and the light transmittance characteristics in the transmission mode in Table 1 can further be improved.

Table 2 below is experimental data showing the haze, light transmittance in the shading mode, and light transmittance in the transmission mode of Embodiments 1 to 3 according to the present invention. For reference, Table 2 shows that the decimal point is rounded off from the result value of each measurement.

TABLE 2

| No. | Haze (0 V) | Toff (0 V) | Ton (Sat.) |
|---|---|---|---|
| Comparative example 1 | 9% | 4% | 29% |
| Comparative example 2 | 9% | 3% | 27% |
| Comparative example 3 | 9% | 2% | 26% |

In Comparative Examples 1 to 3 of Table 2, the type of the dichroic dye 13, the average particle size of the nano liquid crystal capsule 10, the thickness of the liquid crystal capsule layer 100, and the alignment state of the liquid crystal 11 are formed in the same manner as in Embodiments 1 to 7 shown in Table 1.

In particular, comparative Examples 1 to 3 of Table 2 have different birefringence ($\Delta n$) of the liquid crystal 11 compared to Embodiments 1 to 7 of Table 1. Specifically, in Comparative Examples 1 to 3 of Table 2, the birefringence ($\Delta n$) of the liquid crystal 11 was all formed to be 0.27.

In Table 2, the concentration of the dichroic dye 13 in Comparative Example 1 is 6% by weight, the concentration of the dichroic dye 13 in Comparative Example 2 is 7% by weight, and the concentration of the dichroic dye in Embodiment 3 is 8% by weight.

As can be seen in Table 2, when a high shading factor of 2 to 4% of light transmittance is implemented, the light transmittance in the transmission mode drops to less than 30%, so the minimum transmittance (30%) cannot meet the optical characteristics requirement of a smart window for a vehicle.

In addition, it can be seen that the haze also exhibits a very high value of 9% level, which is similar to the haze of a conventional liquid crystal-based light transmission control device.

Figure 7:
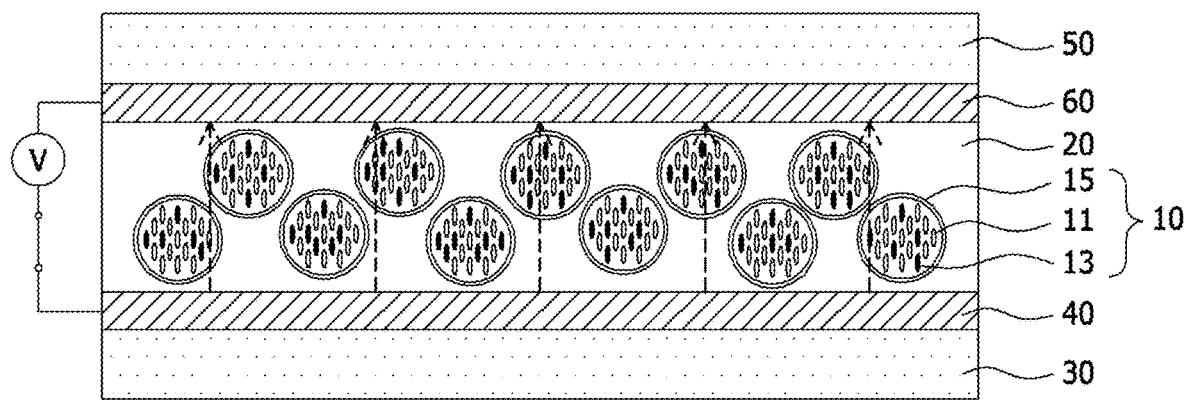
FIG. 7 is a cross-sectional view showing a transmission mode operation of the light transmission control panel for a smart window according to the present invention.

FIG. 6 is a cross-sectional view showing an operation of a light blocking mode of a light transmission control panel for a smart window according to the present invention. FIG. 7 is a cross-sectional view showing a transmission mode operation of a light transmission control panel for a smart window according to the present invention.

Hereinafter, operations in the light blocking mode and the transmission mode will be described with reference to FIGS. 6 and 7.

When a voltage is not applied to the first electrode 40 and the second electrode 60, most of the incident light is absorbed by the dichroic dye 13 to drive the light-blocking mode (see FIG. 6).

When a voltage is applied to the first electrode 40 and the second electrode 60, a vertical electric field is applied to a plurality of liquid crystals 11 and dichroic dyes 13 in the nano liquid crystal capsule 10 so that the liquid crystals 11 are arranged along the electric field direction.

In addition, in conjunction with the arrangement of the liquid crystals 11, the dichroic dye 13 is also arranged along the electric field direction to drive a transmission mode for transmitting incident light (see FIG. 7).

For reference, looking at the driving characteristics of the transmission mode according to the magnitude of the applied voltage, the light transmittance gradually increases as the applied voltage increases, and accordingly, excellent medium level gray characteristics can be implemented.

Thereafter, when the applied voltage reaches the saturation voltage, the light transmittance does not increase any more.

The light transmission control panel of the present invention as described above can be applied to a smart window for a vehicle in the following form.

Figure 9:
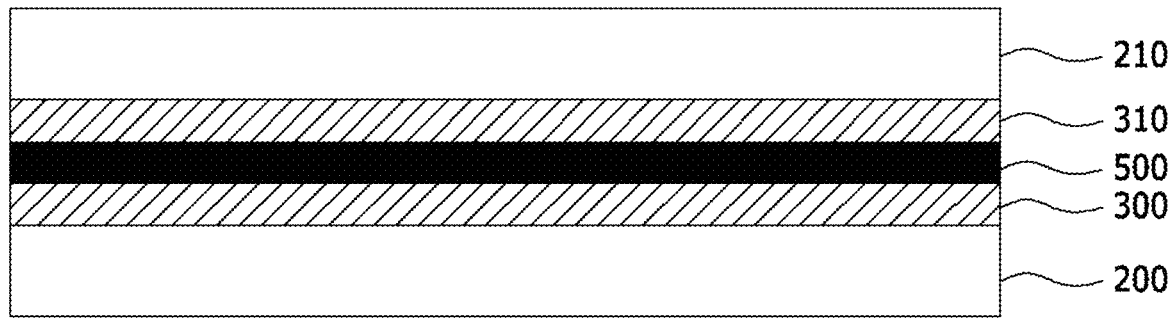
FIG. 9 is a cross-sectional view of a vehicle smart window having a light transmission control panel of the present invention.

FIG. 9 is a cross-sectional view of a smart window for a vehicle having a light transmission control panel of the present invention.

According to an embodiment, the light transmission control panel of the present invention may be installed in a structure interposed between windows of a double structure as shown in FIG. 9.

In this case, the vehicle smart window may include a plate-shaped first window 200, a plate-shaped second window 210, and a light transmission control panel of the present invention interposed between the windows 200 and 210.

Preferably, the smart window for a vehicle further can be included a first adhesive layer 300 formed on one surface of the first window 200 and a second adhesive layer 310 can be included on one surface of the second window 210.

In this case, the first window 200, the light transmission control panel, and the second window 210 may be bonded and fixed to each other by the first and second adhesive layers 300 and 310.

In addition, the first adhesive layer 300 and the second adhesive layer 310 may be formed of at least one selected from PVB (Poly Vinyl Butyral), EVA (Ethylene Vinyl Acetate), PSA (Pressure Sensitive Adhesive), OCA (Optically Clear adhesive) and UV (Ultra Violet) adhesives.

In addition, the first window 200, the second window 210, and the light transmission control panel may be bonded and fixed by exposing the first adhesive layer 300 and the second adhesive layers 310 to an environment of high temperature and high pressure. In this case, the high temperature above 100° C. and high pressure above 5 bar processes may be implemented as in the auto glass industry.

In this case, the first window 200 and the second window 210 may be one selected from tempered glass, transparent engineering plastic, and bulletproof glass.

According to another embodiment, the light transmission control panel for a smart window of the present invention may be attached to one surface of a window installed in a vehicle.

As described above, the light transmission control panel of the present invention can be particularly suitably applied to a smart window for a vehicle. This is because the light transmission control panel of the present invention can realize a very high shading rate, and also can satisfy the light characteristics essential to the smart window for a vehicle (that is, the required light characteristics described above).

Therefore, if an object other than a vehicle smart window (for example, a smart window of a specific building) requires such a required optical characteristic, the light transmission control panel of the present invention can be applied not only to a vehicle but also to such other objects.

What is claimed is:

1. A light transmission control panel for a smart window comprising:
    a first substrate on which a first electrode formed on one surface;
    a second substrate on which a second electrode is formed on one surface; and
    a liquid crystal capsule layer provided between the first substrate and the second substrate,
    wherein the light transmission control panel for the smart window has less than 7% haze, light transmittance of less than 4% in a light-blocking mode and light transmittance of equal to or more than 30% in a light-transmission mode,
    wherein the liquid crystal capsule layer comprises a plurality of nano liquid crystal capsules and a polymer matrix having the plurality of nano liquid crystal capsules disposed therein,
    wherein the nano liquid crystal capsule comprises a core material having a plurality of liquid crystals with positive dielectric anisotropy and dichroic dyes and a shell material forming an outer wall of the core material,
    wherein the average particle size of the plurality of nano liquid crystal capsules is 50 nm~200 nm, the dichroic dye is composed of 2.0 to 12.0% by weight based on the total weight of the core material, and a birefringence ($\Delta n$) of the liquid crystal is 0.01 to 0.18,
    wherein the light transmission control panel is not provided with a polarizing plate.

2. The light transmission control panel for a smart window of claim 1, wherein at least some of the plurality of liquid crystals are aligned a number of different directions in the light-blocking mode.

3. The light transmission control panel for a smart window of claim 1, wherein at least some of the plurality of liquid crystals are aligned radially in a non-voltage state.

4. The light transmission control panel for a smart window of claim wherein the birefringence ($\Delta n$) of the liquid crystal is 0.01~0.16.

5. The light transmission control panel for a smart window of claim 4, wherein the birefringence ($\Delta n$) of the liquid crystal is 0.01~0.14.

6. The light transmission control panel for a smart window of claim 1, wherein the dichroic dye is composed of 4.0 to 10.0% by weight based on the total weight of the core material.

7. The light transmission control panel for a smart window of claim 1, wherein a cell gap of the liquid crystal capsule layer is 5.0 to 15.0 μm.

8. The light transmission control panel for a smart window of claim 7, wherein the cell gap of the liquid crystal capsule layer is 8.0 to 12.0 μm.

9. The light transmission control panel for a smart window of claim 1, wherein the nano liquid crystal capsules are disposed to be dispersed in the polymer matrix at a filling rate of 30 to 70%.

10. The light transmission control panel for a smart window of claim 1, wherein the polymer matrix is formed of a transparent polymer binder.

11. The light transmission control panel for a smart window of claim 1, wherein the first substrate and the second substrate are transparent plastic substrates.

12. The light transmission control panel for a smart window of claim 1, wherein the shell material is made of a polymer material.

13. The light transmission control panel for a smart window of claim 1, wherein a vertical electric field is applied to the plurality of liquid crystals, and the plurality of liquid crystals are arranged along the vertical electric field direction when a voltage is applied to the first electrode and the second electrode.

14. A smart window for a vehicle comprising:
a first window;
a second window attached to the first window; and
the light transmission control panel for a smart window according to claim 1 interposed between the first window and the second window.

15. A smart window for a vehicle of claim 14,
further comprising:
a first adhesive layer formed on one surface of the first window; and
a second adhesive layer formed on one surface of the second window
and wherein the first window, the light transmission control panel for the smart window, and the second window are bonded and fixed to each other by the first and second adhesive layers.

16. A smart window for a vehicle of claim 15,
wherein the first adhesive layer and the second adhesive layer are formed with at least any one selected from PVB, EVA, PSA, OCA and UV adhesives.

17. A smart window for a vehicle of claim 14,
wherein the first window and the second window are formed with at least one selected from tempered glass, transparent engineering plastic, and bulletproof glass.

18. A smart window for a vehicle comprising:
a window; and
the light transmission control panel for a smart window according to claim 1 attached to the window.

19. A smart window for a vehicle comprising:
a first window;
a second window attached to the first window; and
the light transmission control panel for a smart window according to claim 2 interposed between the first window and the second window.

20. A smart window for a vehicle comprising:
a window; and
the light transmission control panel for a smart window according to claim 2 attached to the window.

* * * * *